US010740591B2

(12) United States Patent
Antipa et al.

(10) Patent No.: US 10,740,591 B2
(45) Date of Patent: Aug. 11, 2020

(54) ADAPTIVE CLOTHING 3D MODEL

(71) Applicant: Adobe Inc., San Jose, CA (US)

(72) Inventors: Damien Antipa, Saint-Louis (FR); Alexandre Capt, Landser (FR)

(73) Assignee: Adobe Inc., San Jose, CA (US)

( * ) Notice: Subject to any disclaimer, the term of this patent is extended or adjusted under 35 U.S.C. 154(b) by 141 days.

(21) Appl. No.: 15/244,749

(22) Filed: Aug. 23, 2016

(65) Prior Publication Data
US 2017/0039416 A1 Feb. 9, 2017

Related U.S. Application Data

(63) Continuation of application No. 14/817,778, filed on Aug. 4, 2015, now Pat. No. 9,449,254.

(51) Int. Cl.
G06K 9/00 (2006.01)
G06K 9/62 (2006.01)
G06K 9/46 (2006.01)
G06K 9/74 (2006.01)
G06T 7/90 (2017.01)
G06Q 30/06 (2012.01)

(52) U.S. Cl.
CPC ....... G06K 9/00201 (2013.01); G06K 9/4652 (2013.01); G06K 9/6202 (2013.01); G06K 9/74 (2013.01); G06Q 30/0643 (2013.01); G06T 7/90 (2017.01); G06K 2009/6213 (2013.01); G06T 2207/10016 (2013.01); G06T 2207/10024 (2013.01)

(58) Field of Classification Search
CPC ................ G06Q 30/0643; G06Q 30/00; G06T 2207/30124; G06T 7/194; G06T 19/20; G06K 9/00234
See application file for complete search history.

(56) References Cited

U.S. PATENT DOCUMENTS

| 8,233,661 B2 | 7/2012 | Ikenoue et al. |
| 8,537,154 B2 | 9/2013 | Naito et al. |
| 2012/0201468 A1* | 8/2012 | Oami ................. G06K 9/00362 382/199 |

(Continued)

OTHER PUBLICATIONS

U.S. Appl. No. 14/817,778 , "Notice of Allowance", dated May 20, 2016, 9 pages.

Primary Examiner — Kenny A Cese
(74) Attorney, Agent, or Firm — Kilpatrick Townsend & Stockton LLP

(57) ABSTRACT

Systems and methods provide adapted content to a visitor to a physical environment. An example method receives an image of a visitor to an environment. A visitor portion of the image is distinct from an environment portion of the image. The method detects one or more shapes in the visitor portion of the image using an automatic shape detection technique and defines an approximate boundary of the one or more shapes using a mask. The one or more shapes can be shapes of the visitor's clothing items. The method then calculates an attribute for an area of the image within the mask and identifies electronic content based on the attribute for the area of the image within the mask. The attribute can be a color attribute for the area such as a median color or a dominant color. The method provides the identified electronic content for display in the environment.

20 Claims, 9 Drawing Sheets

(56) References Cited

U.S. PATENT DOCUMENTS

| | | | | |
|---|---|---|---|---|
| 2013/0083999 A1* | 4/2013 | Bhardwaj | .......... | G06Q 30/0643 |
| | | | | 382/165 |
| 2013/0084000 A1* | 4/2013 | Bhardwaj | ................ | G06T 7/41 |
| | | | | 382/165 |
| 2014/0226900 A1* | 8/2014 | Saban | ...................... | G02B 5/08 |
| | | | | 382/165 |
| 2015/0332479 A1* | 11/2015 | Gershon | ............. | G06F 17/3025 |
| | | | | 382/164 |

\* cited by examiner

ADAPTIVE CLOTHING 3D MODEL

CROSS-REFERENCE TO RELATED APPLICATION

This application is a continuation application of and claims priority to application Ser. No. 14/817,778, title "ADAPTIVE ENVIRONMENT TARGETING" filed Aug. 4, 2015, which is incorporated herein by reference in its entirety.

TECHNICAL FIELD

This disclosure relates generally to computer-implemented methods and systems for presenting electronic content on display screens, and more particularly relates to techniques for presenting electronic content that is adapted to targeted people viewing screens in an open, physical environment such as a store.

BACKGROUND

In an establishment with an open environment, such as a retail store, there can be one or more electronic displays for displaying information to patrons, customers, guests, or other visitors. Such displays can be large screens mounted in locations that are readily visible, such as above entrances or aisles, near store shelves or product displays, on walls, or in other suitable locations. The displays can be included in embedded devices that are used for a variety of purposes, such as digital signage, product images, advertising, and providing various other forms of information that may be of interest to the visitors. However, if the content presented on the displays is passive and not dynamically adapted to visitors in the environment, the visitors may not be responsive to products featured on the displays. Conventional electronic displays may only be able to show outdated, non-customized information to the visitors. Such information is not adapted or tailored to specific customers in the environment.

In certain physical environments, digital signage including product images, web content, advertisements, and other electronic content, can be displayed on large screens. One such environment is a retail store. These screens can be in embedded devices that access common content. The screens can share the common content, but not necessarily show content that is relevant to visitors currently in the environment. The content can be pulled or pushed from a system or server, which is typically remote and does not provide content to the embedded devices and their screens that is targeted to visitors that are in proximity to the screens. To achieve high levels of portability, screens of these embedded devices may be dedicated to displaying web content obtained from a remote web server or content repository. Traditional embedded devices must each separately connect to a remote system (e.g., a server or a repository) in order to obtain content to be displayed. However, the content provided to such a device is passive and is not actively adapted to a visitor that is currently looking at the device's screen.

It is desirable to display adapted content to targeted visitors to a physical environment, where the content is displayed on screens in the environment while the visitors are viewing the screens. Efficient adaption and display of such content can increase visitor responsiveness to products depicted in the content while the visitor is in the environment (e.g., while a shopper is in a store).

SUMMARY

In one embodiment, a method includes receiving, at a computing device in a physical environment, an image of a visitor to the physical environment. A visitor portion of the image is distinct from an environment portion of the image. According to an embodiment, the image can be a video frame of a visitor to an environment such as a store. The method then detects one or more shapes in the visitor portion of the image using an automatic shape detection technique and defines an approximate boundary of the one or more shapes using a mask. The one or more shapes can be shapes of clothing items on the visitor. The method calculates an attribute for an area of the image within the mask. The attribute can be a color attribute for the area such as a median color or a dominant color. The attribute can be an item size or item type of an item detected in the area of the image within the mask. The method then identifies electronic content based on the attribute for the area of the image within the mask. The method provides the identified electronic content for display in the environment. The identified electronic content can include product images, web content, a three dimensional (3D) product model, and multimedia content.

In another embodiment, a system has an input device, a display device, a camera, a processor, and a memory. The memory has instructions stored thereon that, if executed by the processor, cause the processor to perform operations for providing adapted content to a visitor to an environment. The operations include receiving, from the camera, an image of a visitor to an environment, a visitor portion of the image being distinct from an environment portion of the image. The operations further include detecting a shape in the visitor portion of the image using an automatic shape detection technique. According to this embodiment, the operations include defining an approximate boundary of the shape using a mask, and calculating an attribute for an area of the image within the mask. The operations also include identifying electronic content based on the attribute for the area of the image within the mask, and then providing the identified electronic content for display in the environment.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
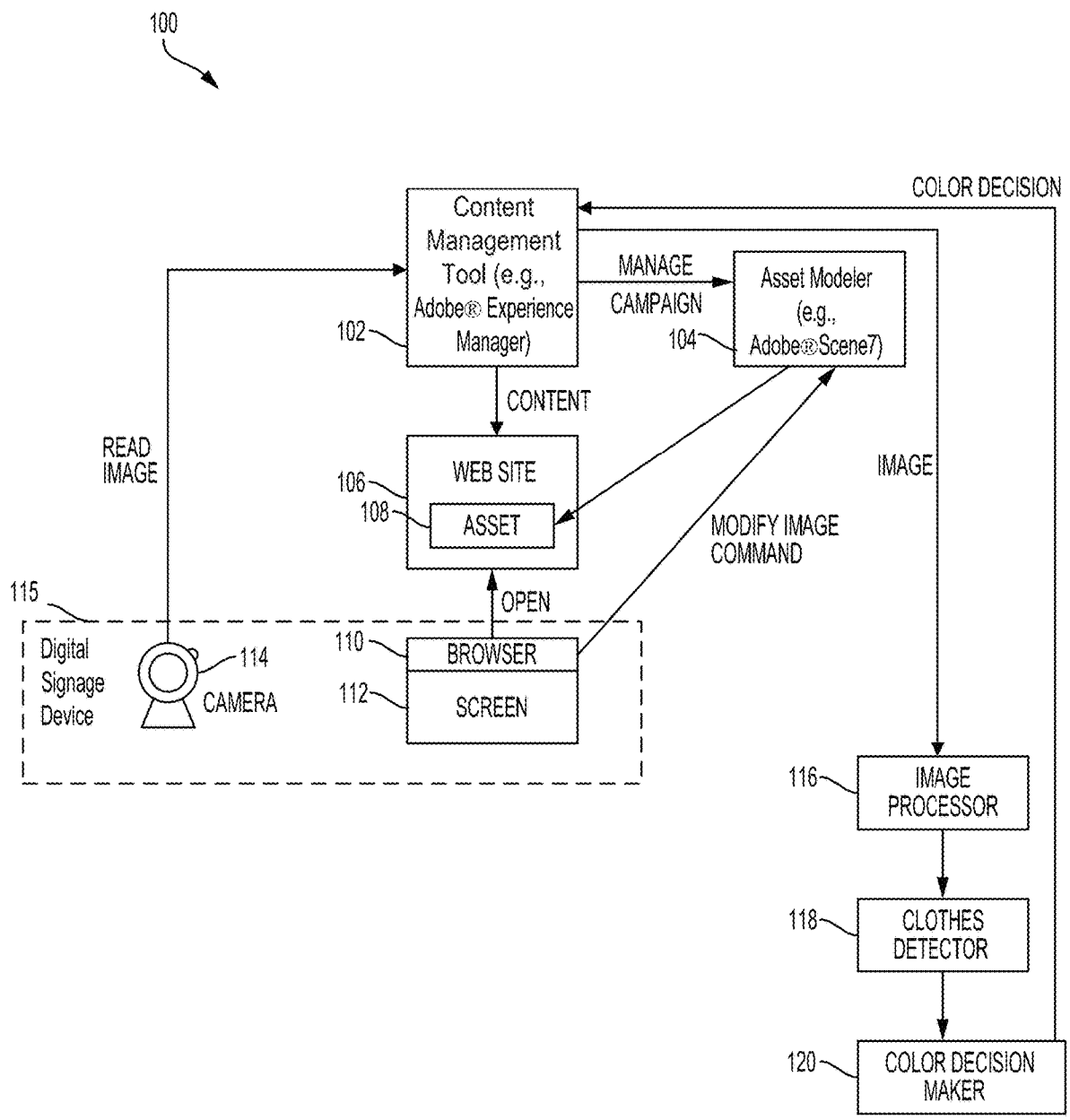
FIG. 1 is a diagram of a system for adapting campaign content to targeted visitors to an environment, in accordance with an embodiment of the present invention.

Content displayed on in-store monitors and other electronic displays in an environment using prior techniques is the same regardless of which visitors are in the store viewing the content. The invention provides adapted electronic content and assets for display that are tailored to one or more of the particular visitors in the store by using one or more images of the visitors in the environment. In one example, an image of a visitor is captured and analyzed (at the device or using a remote server) to identify the portion of the image that corresponds to the visitor. An object, such as shorts, pants, a shirt, a hat, glasses, a tie, a tennis racquet, etc., is identified in the portion of the image, and an attribute of the identified object, such as its color attribute, its item type or size, etc., is used to identify tailored content that is displayed in the environment while the visitor is still in the environment (e.g., while a shopper is in a store). This can be facilitated by defining an approximate boundary of the shape using a computer-generated mask and then identifying one or more attributes of the image within the mask for use in identifying the tailored content. Because attributes of the visitor are used to automatically select the adapted content, the visitor is presented with content that is more likely relevant to the visitor's interests. Presenting such adapted content for a product to a targeted visitor is more likely to engage that visitor in the product. Increasing visitor engagement can result in a higher conversion rate (e.g., converting a visitor into a purchaser). In one particular example, a store visitor wearing blue jeans and a white shirt is presented with an advertisement for shoes offered in the store where the shoes are depicted in colors that complement the visitor's jeans and shirt. The advertisement is displayed to the visitor on an in-store display screen while the visitor is shopping in the store.

Embodiments provide a system including a digital signage device connected to a screen via a video interface. The digital signage device has a connection to at least one video camera. For example, the video camera can be installed in front of the screen, pointing in the direction of a viewer of a screen. In certain embodiments, the camera can be a webcam or any camera capable of capturing video frames of a person proximate to the screen. In some embodiments, the device has connections to other input devices such as a touchscreen, a keyboard, and a pointing device. The device can be attached to a local network, such as a local area network (LAN) or an Internet connection. The digital signage device can be located in an open environment such as a store.

In one example, when a person stops to look at the screen of an in-store digital signage device, the device's camera captures a video frame of the person. Then, an automatic camera-based clothing pattern recognition or assistive clothing pattern recognition technique can be used to detect shapes of clothes on the person. Next, a mask is applied for the detected clothes shapes. An embodiment automatically chooses an appropriate mask size for each of the detected clothes shapes instead of using fixed geometrical shapes. A mask for a clothing item shape can be created by classifying each pixel in an area of the image as being part of the clothing item or not. The mask is applied to the image and can be used to determine color attributes of the person's clothing items. A color attribute can be any measure of color(s) present in an area of an image. An example color attribute can be a simple statistical median of colors present in a clothing item (e.g., in the mask area of the image). Such a color attribute can be expressed in terms of regular red green blue (RGB) color values. Another example color attribute is a dominant color for a multicolored or patterned clothing item. For instance, plaid, striped, checkered, or otherwise patterned clothing may contain multiple shades of hues of blue and only one shade or hue of red. In this example, the dominant color of the clothing item will be blue.

After the color attributes of the person's clothing items are determined, a 3D model of an advertised product can be adapted by matching a color scheme of the model with the color attributes of the person's clothing items. The matching can depend on the product being advertised, and a predefined marketing campaign for the product. A marketer interface can be used to define a marketing campaign for the product that stipulates how the product's color schemes are to be matched to color attributes of a person's clothes. For example, a marketer can use the interface to indicate whether the product's colors should match with the person's shirt rather than the person's skirt or pants. Similarly, the marketer can indicate if the product's colors should match specific color attributes. For instance, the marketer can indicate if the product model should have similar colors to the person's clothing or inverse colors. An embodiment may also be used to suggest improvements to the person's clothing colors by providing the person with images of more complimentary color matches via the in-store digital signage device.

In order to provide an experience that is adapted to a visitor to an environment where a digital signage device is installed, embodiments provide a mechanism to let the device communicate with a content management tool and an asset modeler (see, e.g., content management tool 102, asset modeler 104, and digital signage device 115 in FIG. 1). In an embodiment, the device can provide a plain browser or an embedded browser environment using a browser such as, for example, Chromium, to run a web application. The web application, referred to herein as a player application or player app, can be configured to communicate with a web server on the same digital signage device that hosts the player application. In additional or alternative embodiments, the device can render electronic content in a native application or as part of a video using any rendering mechanism. In one embodiment, the communication between the player application and the local web server is over a Websocket connection. For instance, the Websocket connection can be a connection compliant with a World Wide Web Consortium (W3C) standard. In one example embodiment, the local host can be implemented as an embedded web server that provides a data backend. The browser can be used to access a web site that includes an asset such as an image of a product. Content of the web site can be retrieved from a content management tool, and the asset can be retrieved from an asset modeler. In certain embodiments, this retrieval of web site content and assets is achieved via communications between a digital signage device, a content management tool, and an asset modeler (see, e.g., digital signage device 115, content management tool 102, and asset modeler 104 in FIG. 1). These communications may be done through Websocket connections.

By using the systems and methods described herein, a digital signage device in an environment can present content on its screen that is adapted to a visitor to the environment while the visitor is viewing the screen. This content can be tailored to a particular visitor based on what that visitor is wearing. For example, by analyzing color of clothing items present in an image of the visitor captured by a camera of the device, the device can present content that is adapted to what that visitor is wearing. The adaptation of content to the visitor can be performed in part by a remote server such as a server used to implement the content management tool 102 shown in FIG. 1.

When a visitor to an establishment views a screen of a digital signage device, embodiments enable the device to present content that it is customized or tailored for that visitor. This tailored content can then be targeted for a visitor that is near the digital signage device at the establishment. Many establishments, such as retail stores and office buildings, have computing devices with network connectivity and web browsers or other applications for accessing and presenting information. These computing devices may be mobile or embedded devices installed in fixed locations (e.g., wall-mounted or installed in a kiosk) within a particular environment. When a visitor is in close proximity to one of the establishment's devices, there is an opportunity for the device to capture an image of the visitor and present content that is adapted for that visitor based on the captured image. Requiring each digital signage device at a location to individually display tailored content using a remote system such as a campaign management system, a remote web server, or a content delivery system, can require bandwidth intensive communications. These communications can delay delivery of content to the digital signage devices, thus introducing lag times and preventing the devices from presenting timely, adapted content while the visitor is still in close proximity to one of the devices. These and other limitations increase the difficulty of displaying adapted content for a particular visitor at a location.

To this end, and in accordance with embodiments, techniques are disclosed for presenting content that is adapted to a visitor to an establishment that is in close proximity to a digital signage device's display screen. The digital signage device is configured to execute a local web browser, which can include a suitable player application for retrieving, displaying, and interacting with content. The device can be a digital signage device. The device can include a camera and can use the Web Real-Time Communication (WebRTC) application programming interface (API) to access the camera. The device can use the Web Graphics Library (WebGL) JavaScript API to render interactive three-dimensional (3D) graphics adapted for the visitor. For example, WebGL can be used to draw 3D models of assets or products (e.g., a 3D model of a shoe) on the display of the device. The web browser of the device can be configured to display, among other things, electronic assets and web content, such as, for example, interactive web content, signage, product images, 3D models of products, and marketing content including offers and advertisements. A user of the device (e.g., the visitor) can interact with the content. For instance, the visitor can use a touchscreen or other input device to manipulate and view a 3D image of a product by rotating and zooming the image.

Example Use Cases

One example use case is as follows. A digital signage device has its own screen in a retail store. The device can be a digital signage device, a kiosk, or a wall-mounted device at a location in the store. The digital signage device is configured to display product images, offers, and other dynamic content to customers in the store. The digital signage device has input devices (e.g., camera, touchscreen display, keyboard, pointing device, or other input devices) that the customers can use to provide input to the device. The store's webpage or other content pertinent to the store is displayed on the screen. For example, if the digital signage device is in the store's shoe section, images of shoes available for purchase at the store may be displayed. The device can use the WebRTC API to access a camera (e.g., a webcam) installed near the digital signage device. For instance, a video camera mounted at the top of the digital signage device's screen can capture video frames of customers that pause in front of the display. Similarly, for example, a webcam that streams images in real time to a communications network can also capture video frames of customers that pause in front of the display.

By using an image capture device such as a camera, the digital signage device can detect that a customer has paused in front of or is viewing the screen, and then use the camera to capture an image of the customer. That is, the image of the customer is input obtained via the digital signage device's camera. The camera can capture images periodically. For instance, a webcam installed near the screen can capture video frames every second or every five seconds. When it is determined that a captured image (e.g., a video frame) includes a customer, the device analyzes this particular frame and determines see if the customer is in close proximity to the screen. If so, the device provides the video frame to a system that performs clothing pattern recognition. One example technique is assistive clothing pattern recognition. Assistive clothing pattern recognition can be used to find simple clothing patterns in the video frame. Examples of such clothing patterns include a t-shirt, pants, a blouse, shorts, and a skirt. The clothing pattern recognition detects shapes of clothing items worn by the customer, and then compares those shapes to pre-defined shapes. For example, regardless of the customer's gender or size, a t-shirt worn by the customer will have a similar shape and can be identified as a t-shirt based on its shape.

After analyzing the video frame and determining that there is a person in front of the screen, masking is done on the frame. Masking is done in order to delineate between different clothing items present in the frame. Mask accomplishes this by creating a mask corresponding to a shape of each clothing item detected in the frame. For example, a mask for a t-shirt worn by a person can be created by classifying each pixel in the area of the image corresponding to the t-shirt as being part of the mask. In this case, other pixels of the image are not included in the t-shirt mask (see, e.g., the shirt mask shown in step 206 of FIG. 2). The t-shirt mask is created so that the mask has a shape and dimensions similar to the actual t-shirt in the image.

By applying a mask for each clothing item found in the frame, a respective color attribute of each item can be determined. A mask can be created by using a cut of the frame where a clothing item (e.g., a t-shirt) is positioned in the frame. In one example, HTML5 camera technology can be used by the device to draw the image with the mask into the camera. This drawing is done in the background. That is, the masked image is not depicted on the screen for the customer to view. The masked image has the position of the clothing item cut out of the original video frame image of the customer. Next, the mask is used to determine colors within the mask area. For instance, the mask can be used to determine an average color or most dominant colors within the mask area. A most dominant color can be a color present in more pixels within the mask area (or a subset thereof) than other colors, but not present in enough pixels to constitute an average color for the mask area (or the subset). The average color can be an average or median color of the whole clothing item (e.g., the entire t-shirt). In an additional or alternative embodiment, the device can figure out if the top of the t-shirt area is different from the bottom color. At this point, the mask can be used many different ways in order to determine average colors present within the mask area. Once the colors are determined, the device can present a color-matched image of a complimentary product on the screen. For example, an image of a shoe having a color scheme that compliments the t-shirt can be presented on the screen. Complimentary colors and compatible color schemes can be selected by a marketer ahead of time. For instance, a marketer can use a user interface to define a campaign based on customers' clothes where the interface enables the marketer to select products with certain color schemes to be presented to a customer wearing clothes having certain colors. With the example of a shoe, a default color of red can be selected, and when a customer stops in front of the screen and the device determines that the person is wearing a blue t-shirt and white pants, then the device can decide, based upon determining that the t-shirt is blue, to try to find a matching or complimentary blue color for the shoe. The device may then present a 3D model of the shoe with a changed color (from red to blue). In addition to the t-shirt, the color matching decision for the shoe can be further based on a calculated average color of pants or a skirt the customer is wearing.

Another example use case is as follows. In a location such as a retail store, a mobile device or a tethered device (e.g., a tethered tablet) has a screen that is displaying content of the store's web site. A shopper in the store interacts with the screen to navigate to a product of interest. As the shopper is using the device, an integrated camera in the device captures an image of the shopper. At this point, the clothing pattern recognition, masking, and color analysis discussed above is performed. The colors of the shopper's clothing items can be determined by going pixel by pixel through a masked area corresponding to each detected clothing item and calculating the most dominant colors, an average color, and/or the statistical median color of the pixels making up the clothing item. Alternatively, a median color or dominant can be determined instead of the average. This may be useful in cases where clothing items are multicolored or patterned. Also, as discussed above, the color analysis could also try to figure out an average color of a top (e.g., a shirt or blouse) and an average color of a bottom (e.g., pants, shorts, or a skirt). After analyzing the color of the clothing items, product images with color schemes that compliment what the shopper is wearing are presented on the screen. In this way, the shopper can be presented with an image of a product that is color-matched to be coordinated with what the shopper is currently wearing. The customer can then interact with the screen to manipulate the image (e.g., rotate and/or zoom the image, change the product color(s), and simulate selection of product accessories). The shopper can also use the device to determine in-store availability of the product having the selected color scheme. Numerous other example use cases for adapting content for targeted visitors to an environment will be apparent in light of this disclosure.

As used herein, a "computing device" refers to any type of computing device configured to communicate with another computing device over a network to access information, including mobile computing devices, servers, and other computing devices. A mobile computing device may allow mobility to the user during at least operation and may include, for example, a mobile phone, a smart phone, a personal digital assistant (PDA), a tablet device, and other mobile computing devices. In comparison, other computing devices may be more stationary, may include relatively more processing power and memory space than those of mobile computing devices, and may have an operating system that is more sophisticated than operating systems typically running on mobile computing devices. A laptop, a tablet device, a personal computer, a desktop computer, a digital signage device, and a server are examples of such other computing devices.

As used herein, the terms "embedded device" and "digital signage device" refer to any computing device configured to exchange and display electronic content in an environment. In one embodiment, a digital signage device has a display device (e.g., a screen), and hosts a browser. The browser can display content from a web server. According to this embodiment, the browser can include a player application configured to provide a view of electronic content on the display device. The electronic content can include a 3D model of a product, product images, and product videos. In some embodiments, digital signage devices can be embedded devices at a location in the environment such as, for example, kiosks, wall-mounted devices, or table-mounted devices at locations in a store.

As used herein, "application" refers to a program configured to access and retrieve information hosted on a computing system (e.g., content from a web site hosted on a server, web management system, and/or a content delivery system) and to render the information at a user interface. Examples of such an application include a content management tool, an asset modeler, a web browser, a player application (e.g., a player app or a video rendering app), a script or a plug-in that runs within a web browser, a program that is hosted in a web browser, a program that is separate from but that interfaces with a web browser such as a player application, a native application on a device, an image processor, a clothes detector, a color decision maker, and other types of programs capable of using local memory and a rendering engine to access and render content.

As used herein, the terms "web browser" and "browser" refer to any application for retrieving, presenting and traversing information resources. Such information resources may be referenced via a Uniform Resource Identifier or Locator (URI/URL) and contain any type of web content. Non-limiting examples of a web browser include Microsoft® Internet Explorer, Safari from Apple Inc., Mozilla Firefox, Opera, and Google® Chrome.

As used herein, the terms "electronic content", "content", "web content," "campaign content", "marketing content", "assets", "electronic assets", or "campaign assets" refer to any type of resource or media that can be rendered for display on computing devices. Electronic content can include text or multimedia files, such as images, 3D graphics, video, audio, or any combination thereof. Electronic content can include digital signage content, product images, 3D product models, advertising content (e.g., content for in-store advertisements), promotional content, and web content. Electronic content can also include application software that is designed to perform one or more specific tasks at a computing system or computing device. Computing devices include client and server devices such as, but not limited to, servers, desktop computers, laptop computers, smart phones, video game consoles, smart televisions, tablet computers, portable gaming devices, personal digital assistants (PDAs), etc. Electronic content can be streamed to, replicated to, downloaded by, and/or uploaded from computing devices. Electronic content can include multimedia hosted on web sites, such as Internet web sites, intranet web sites, standard web pages, or mobile web pages specifically formatted for display on mobile computing devices. Electronic content can also include application software developed for computing devices where the software is designed to perform one or more specific tasks at the computing device.

Electronic content can be in the form of electronic content streamed from a server system to a client computing device. Streaming electronic content can include, for example, audiovisual content provided using a streaming protocol, such as, but not limited to, real time messaging protocol (RTMP), HTTP dynamic streaming (HDS), and HTTP Live Streaming (HLS).

As used herein, the terms "visitor", "shopper", "person", and "customer" refer to any person present in a physical environment. In one embodiment, a visitor is a person who visits an open physical environment such as a retail store. A visitor to an environment can view a screen of a digital signage device in the environment, and an image of the visitor can be captured by a camera associated with the digital signage device. There is a visitor portion of the image, and an environment portion of the image.

As used herein, "visitor portion of the image" refers to a portion of an image that includes the visitor, items worn by the visitor (e.g., apparel items, glasses, ties, hats, et al.), and other items held or carried by the visitor (e.g., sports equipment, bags, purses, and luggage). For instance, the visitor portion of an image captured in a retail store will depict a store visitor (e.g., shopper), as opposed to the non-visitor items in the foreground or background of the image (e.g., store shelves, displays, and products for sale).

As used herein "environment portion of the image" refers to a portion of an image that includes non-visitor items depicting the physical environment where the image was captured. For example, the environment portion of an image captured in a store may include store fixtures, shelves, products, and displays in the image background or foreground that do not form part of the visitor portion of the image. A physical environment can be a store, an area of a store, a lobby of a building, a public transit station, a convention center, a music or sports venue, a conference room in a building, or any other location accessible by visitors.

In an example embodiment, a web site displayed at a digital signage device can connect to a content management tool and an asset modeler for content retrieval purposes. For example, an in-store digital signage device can connect to a remote server of a content management tool and an asset modeler to obtain campaign assets and content for a store website. The digital signage device retrieves content for a website, which can be shown to a store visitor on a large screen (e.g., a connected/smart television, a conventional television, or computer display device, including a liquid crystal display (LCD) or a light emitting diode (LED) display) of the digital signage device. In one embodiment, the screen of the digital signage device is sufficiently large to display a life-sized image of the visitor along with content including life-sized images of one or more products. The content can include images, video, or code executable for rendering images, video and/or text on the display (e.g., JavaScript code). The content can include electronic campaign assets, such as, for example, 3D product models, documents, graphics, advertisements, presentations, streaming content, HTML files, or any other form of data. The content, when displayed on the digital signage device, can be specifically adapted for a visitor viewing the screen of the digital signage device. In some cases, a capture image of the visitor is sent from the digital signage device to the asset modeler so that the modeler can uniquely adapt the colors of a product model based on colors of clothing present in the image of visitor. In such cases, the asset modeler sends product images or models customized for the visitor while the visitor is in proximity to the digital signage device. Such content can be displayed on a screen of the digital signage device. The digital signage device can be embodied, for example, as an embedded device with a large, mounted screen and/or a mobile device. The digital signage device can be associated with a certain location in an open environment, such as an area of a store, a lobby of a building, a public transit station, a conference room in a building, or a publicly accessible location.

Example System

FIG. 1 illustrates an example system 100 for adapting campaign content to targeted visitors to an environment. Certain components of system 100 can be implemented, for example, in an open environment such as a retail store. System 100 is configured to adapt campaign content to target visitors to an environment, such as shoppers in a store. As shown, system 100 includes a content management tool 102, an asset modeler 104, and a digital signage device 115 with a browser 110, a display screen 112, and a camera 114. The system 100 also includes an image processor 116, a clothes detector 118, and a color decision maker 120. The components of system 100 can be connected to each other via a local area network (LAN), and/or a wide area network (WAN) such as the Internet. Some of the components, such as digital signage device 115, can be installed locally in an open environment such as a retail store.

In an embodiment, system 100 can comprise one or more components, such as, but not limited to, content management tool 102, asset modeler 104, an input device configured to interact with a browser such as browser 110, a touch screen display device configured to render a content view, such as screen 112. As shown, a digital signage device 115 can include browser 110, screen 112, and camera 114. In additional or alternative embodiments, digital signage device 115 can render electronic content in a native application or render video using any rendering mechanism. Embodiments are not limited to this example system 100, and it would be apparent to those skilled in the art that other content navigation and display devices can be used in embodiments described herein as digital signage devices, including, but not limited to, embedded devices, personal computers, mobile devices such as smart phones, laptops, tablet computing devices, or other devices suitable for rendering content on a display such as screen 112. Many additional devices can be used with system 100, beyond the components and devices illustrated in FIG. 1. In an embodiment, a digital signage device may be integrated with screen 112, so that the two form a single, integrated component. For example, digital signage devices can include any suitable computing devices for communicating via a LAN and/or WAN, rendering a user interface (UI), and/or executing browser 110 to render web site 106 with asset 108.

As shown in FIG. 1, each of the content management tool 102, asset modeler 104 and browser 110 are communicatively coupled to each other. This coupling can be through a local area network (LAN) such as a LAN at a retail store. The components of system 100 shown in FIG. 1 can also be communicatively coupled through a wide area network (WAN). Although not depicted in FIG. 1, in an alternative embodiment, a content repository can be located separately from system 100 and content management tool 102. Content management tool 102, asset modeler 104, and browser 110 can receive operational commands from users via respective input devices. The input devices can include, for example touchscreen displays. The operational commands can include commands to initiate navigation in browser 110 or selecting assets and content via content management tool 102. For example, commands to navigate to, select, view, and modify assets such as product images can be received at an input device of content management tool 102. An external keyboard, pointing device, remote control (not shown), or other input device may be used to control operation of content management tool 102, asset modeler 104, and browser 110. Some embedded digital signage devices may have integrated input devices or controls thereon not requiring the use of an external input device. For example, digital signage device 115 can be embodied as a kiosk wherein screen 112 is an embedded display within the kiosk and browser 110 executes on one or more processors housed within the kiosk.

It is to be appreciated that the content management tool 102 could provide any type of audio/visual content. Content playing, viewing, and interaction as described herein refers to any use of content that is, generally, available for delivery to an individual digital signage device. Targeted campaign content delivery to a given digital signage device such as screen 112 can be initiated upon an explicit push from a color decision maker 120 or as a pull in response to an explicit request from a user (e.g., a shopper) at that digital signage device. Content management tool 102 may also be referred to as a "server" herein. As part of a product browsing session in browser 110, asset modeler 104 can provide a color-matched model of an asset (e.g., a 3D model of a target product) stored in a content repository or remotely at a web server. In the example shown in FIG. 1, asset modeler 104 can be implemented using the Adobe® Scene7 dynamic media platform.

According to an embodiment, content management tool 102 displays marketer UIs (shown in FIGS. 6-8) including a UI for selecting content and versions of content to be displayed on different types of devices (e.g., digital signage devices, smart TVs, and mobile devices). In embodiments, screen 112 may be one or more of a television, a network-enabled television, a monitor, the display of a tablet device, the display of a laptop, the display of a mobile phone, or the display of a personal computer. In an embodiment, digital signage device 115 includes a cable set top box (STB) connected to screen 112. In this embodiment, screen 112 may be a television or monitor connected to the STB of digital signage device 115.

Content management tool 102 can provide different versions of content for web site 106 via a WAN. These versions can include content matched to a type of screen 112 associated with a particular digital signage device 115. In embodiments, a particular one of versions of content can optionally be selected by a marketer or system administrator, where the selection is based in part on characteristics of a particular screen 112 where the version of content is to be viewed. The version of content for web site 106 provided to digital signage device 115 may be resident in any suitable computer-readable medium, database, and/or memory, accessible by browser 110 or a player application hosted on that digital signage device 115. In one embodiment, a particular one of the versions is provided in a resolution compatible with a particular screen 112 of a digital signage device that the content is to be viewed on. In one embodiment, the various versions of the content (e.g., different versions of image data) can be accessed by the content management tool 102 from a remote location via a WAN and provided to a digital signage device. Each of the versions can include a copy of some or all of the content encoded at a given bit rate and/or bit size appropriate for the destination digital signage device.

Content management tool 102 can include any suitable computing system for hosting and delivering content. For instance, content management tool 102 can include a back-end server that is remote from digital signage device 115 at a store. In one embodiment, content management tool 102 and asset modeler 104 may be hosted on a single computing system. In other embodiments, content management tool 102 and asset modeler 104 may be hosted on separate servers, or on a virtual server implemented using multiple computing systems or servers connected in a grid or cloud computing topology. As described below with reference to FIG. 9, web management system can be implemented on a computing system having a single processor in a multi-core/multiprocessor system. Such a system can be configured to operate alone with a single back end server, or in a cluster of computing devices operating in a cluster or server farm used to implement content management tool 102.

Electronic content and other data may be exchanged between components of system 100 via a data communications network such as the Internet, a wide area network (WAN), or a local area network (LAN). For instance, in an environment where browser 110, screen 112, and camera 114 are installed as components of an in-store digital signage device, a LAN at the store can be used to exchange data between content management tool 102, asset modeler 104, and browser 110 of digital signage device 115. In embodiments, an in-store LAN and/or a WAN can be one of or a combination of a wireless or wired network such as WiFi®, Internet, Hybrid Fiber Coax, Data Over Cable Service Interface Specification (DOCSIS), ATM or any other wired or wireless network. Content management tool 102 and asset modeler 104 may store and deliver content including but not limited to interactive 3D product models, product images, streaming video, web content for web site 106, assets 108 such as in-store advertisements, promotional content, and adapted images of a shopper. Certain types of delivered content can be interactive and can be manipulated by store visitors at digital signage device 115. For example, a shopper may be able rotate, zoom, and otherwise manipulate a 3D image of a product image included as an asset 108 in the web site 106 that the shopper is viewing on screen 112. By using digital signage device 115, a store visitor whose image is captured by camera 114 will be able to view and interact with content that has been selected and adapted based on what the visitor is wearing.

Although only a single digital signage device 115 is shown in FIG. 1, it is to be understood that by using system 100, adapted content can be presented to multiple digital signage devices in an environment such as a store. For example, a first asset 108 (e.g., a product image with a color scheme) adapted for a first customer at digital signage device 115 can be displayed on screen 112 while another adapted asset (e.g., an image of another product, or an image of the same product with a different color scheme) can be displayed on another digital signage device.

Digital signage devices 115 at different locations in a store can establish respective network connections via a LAN with each other. The digital signage devices can also establish respective network connections with content management tool 102 and asset modeler 104 via a WAN. A browser 110 or content player application can be executed at digital signage device 115 to establish network connections via a LAN to access content of web site 106. The network connections can be used to provide targeted content by communicating packetized data representing the content to digital signage devices 115. Embodiments improve the efficiency and operation of system 100 by automatically adapting and tailoring content to a particular customer who is viewing screen 112 instead of providing all possible permutations of product content. For example, embodiments reduce the amount of generic content sent to digital signage device 115, thus using less computing resources to transmit content via a LAN or WAN, while also requiring less resources from digital signage device 115 to render the content on screen 112. That is, adapting product images to match a customer's clothes avoids the need for system 100 to transmit and present product images for all possible product color combinations or schemes. Using a computing device to automatically select product images matching the customer's clothes also enables system 100 to present the product images to the customer in near real-time while the customer is still viewing screen 112.

Screen 112 can be integrated with digital signage device 115 that hosts browser 110. As illustrated in FIG. 1, screen 112 can be communicatively connected to camera 114, which can read images of visitors that are near screen 112. For example, camera 114 can be mounted on the top of screen 112 so that camera 114 can capture images of shoppers that pause in front of screen 112. The system 100 accesses a data backend, such as content management tool 102, in order to manage a campaign. In one embodiment, assets to be included in a campaign can be designated or selected by a marketer using a user interface of content management tool 102. For example, content management tool 102 may be used to select product images and other asset content that is modeled by asset modeler 104. As shown in the example of FIG. 1, content management tool 102 can be embodied as an Adobe® Experience Manager system.

The content management tool 102 and asset modeler 104 can be located off-site, remote from a store location where browser 110, screen 112, and camera 114 are located. The content management tool 102 can be implemented as part of a content management system providing a marketer user interface (UI), a staging area for campaign content, and publishing of activated campaign assets. Examples of marketer UIs are discussed below with reference to FIGS. 6-8. In one example embodiment, a content management tool such as Adobe® Experience Manager can be used as the content management tool 102. The content management tool 102 can maintain sets of assets for a promotional or marketing campaign to be modeled by asset modeler 104 and displayed on screen 112. In some embodiments, content management tool 102 can be implemented as a content delivery system.

The digital signage device 115 with screen 112 and camera 114 can receive data from the content management tool 102 via web site 106. The data can include electronic content of website 106 such as HTML documents, images, video, et al. to be displayed by the browser 110. The digital signage device 115 is configured to use browser 110 to display content of web site 106 that can be persisted on a web server by content management tool 102. The content of web site 106 can include images read by camera 114. As shown in FIG. 1, an image read by camera 114 can be transmitted to content management tool 102. After the read image is received by content management tool 102, the image can be transmitted to image processor 116 for processing. The functionality of image processor 116 is described in the following paragraph. Product images and models (e.g., assets 108) can be adapted or modified for a visitor by asset modeler 104. As shown, web site 106 can also include one or more assets 108 received from asset modeler 104. As shown in FIG. 1, browser 110 can send modify image commands to asset modeler 104. The modify image commands can instruct asset modeler to model a certain color scheme for asset 108, where the color scheme is based on decisions made by color decision maker 120, which is described below. In the non-limiting example of FIG. 1, asset modeler 104 can be implemented using the Adobe® Scene7 dynamic media platform. Asset modeler 104 can be used to create an asset such as a 3D model of a product or a product image. Asset modeler then includes the asset 108 in web site 106. At this point, asset 108 is available for presentation by browser 110 on screen 112.

System 100 also includes image processor 116, clothes detector 118, and color decision maker 120. In the example of FIG. 1, digital signage device 115 can send a video frame image read by camera 114 to content management tool 102, which in turn sends the image to image processor 116. Image processor 116 can process the video frame to determine that the image includes a person who stopped to look at screen 112 or is within range of camera 114. For instance, image processor 116 can detect, based on an image from camera 114, that the image includes a shopper at an in-store display screen 112. Image processor 116 can detect the shopper within a visitor portion of the image, where the visitor portion of the image is distinct from an environment portion of the image. Once image processor 116 detects a person, it can pass the image of the person to clothes detector 118. Clothes detector 118 can detect shapes in the image and apply masks to the detected shapes. Clothes detector 118 can detect shapes of clothing items worn by a visitor (e.g., a shopper or customer) in the visitor portion of the image using an automatic shape detection technique. Examples of such techniques include assistive clothing pattern recognition and automatic clothing pattern recognition. As would be readily apparent to one of ordinary skill in the art, assistive clothing pattern recognition and automatic clothing pattern recognition can be used to perform shape recognition for clothing item shapes as well as color identification for clothing item shapes. For example, clothes detector 118 can detect shapes of multiple clothing items (e.g., a top such as shirt and a bottom such as pants or a skirt) worn by a shopper near digital signage device 115. Examples of such detected clothing item shapes are depicted in FIGS. 2 and 3 (see, e.g., steps 206-208 of FIG. 2 and time 306 in FIG. 3).

After the clothing shapes are detected and corresponding masks are applied, color decision maker 120 can analyze each detected shape in order to calculate a statistical median color or a dominant color present within each shape. In one embodiment, color decision maker 120 can create regular red green blue (RGB) color values for each shape corresponding to a clothing item worn by the shopper near digital signage device 115. According to this embodiment, color decision maker 120 calculates RGB color values for each mask area, where the RGB color values correspond to the RGB color model. After a median or dominant color is calculated for each detected clothing item, color decision maker 120 decides compatible or complimentary colors for the asset 108 being displayed with web site 106. As shown, the color decision made by color decision maker 120 is then provided to content management tool 102, which in turn coordinates with asset modeler 104 to deliver updated assets 108 to screen 112 of digital signage device 115 via web site 106. The color decision regarding compatible colors can be made based on a complimentary product color scheme that was previously selected using content management tool 102. For example, a marketer can interact with a user interface of content management tool 102 to select pairings of product colors that the marketer deems to be compatible with or complimentary to certain clothing colors. The clothing colors can be expressed in terms of RGB color values. In this way, when browser 110 opens web site 106 with asset 108, the asset 108 will be rendered having a color scheme (e.g., a single color or a plurality of colors) that the marketer has previously selected as being compatible with colors present in the clothes worn by the shopper near digital signage device 115. In an embodiment, clothes detector 118 and color decision maker 120 can be invoked iteratively in order to detect multiple shapes (e.g., multiple items of clothes) and calculate an average or dominant color present within each detected shape. According to this embodiment, for each iteration or loop, the color decision for a given shape in a plurality of detected shapes is passed to content management tool 102.

Example Workflow

Figure 2:
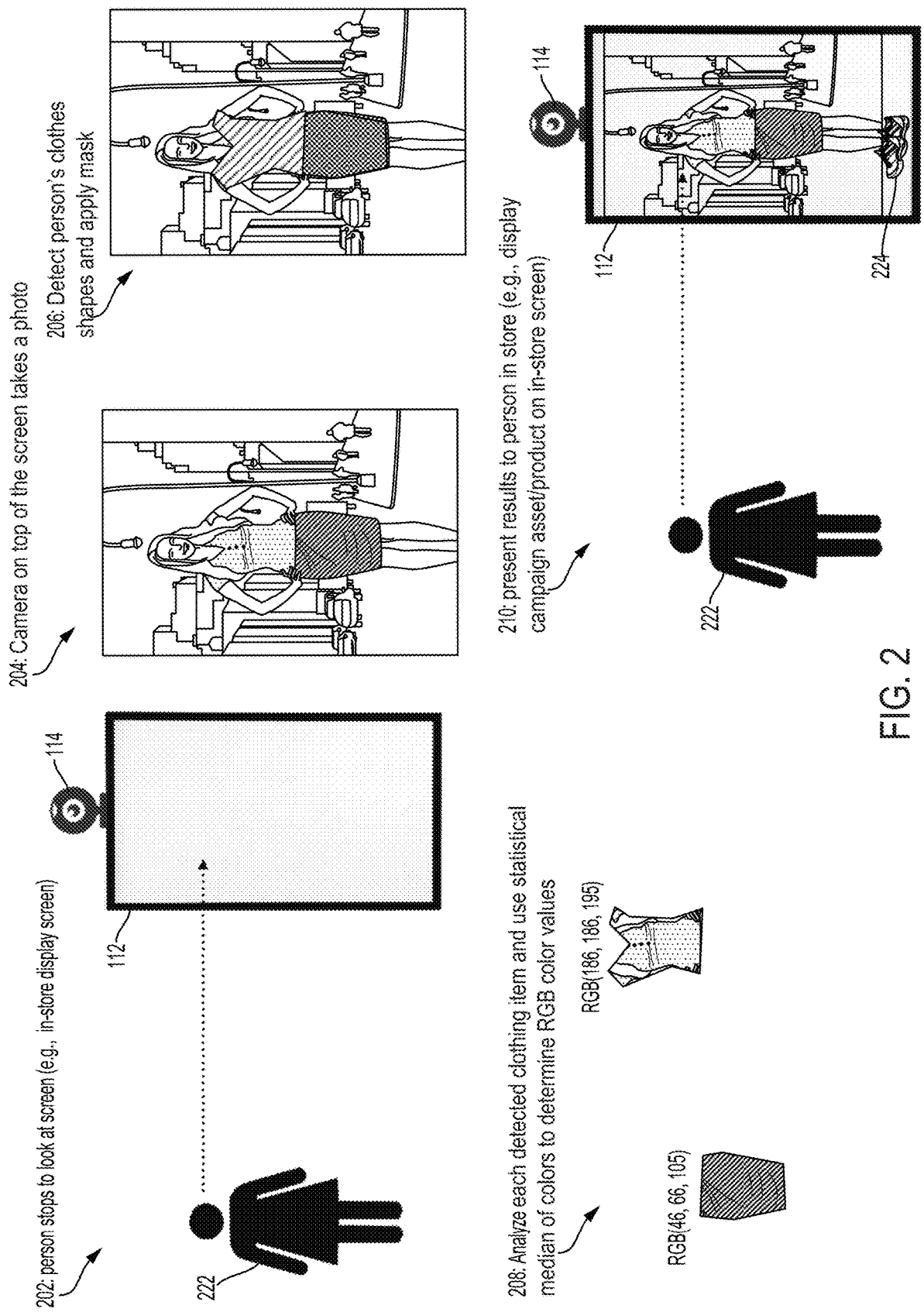
FIG. 2 illustrates an example workflow for adapting content to a targeted visitor to an environment, in accordance with an embodiment of the present invention.
Figure 3:
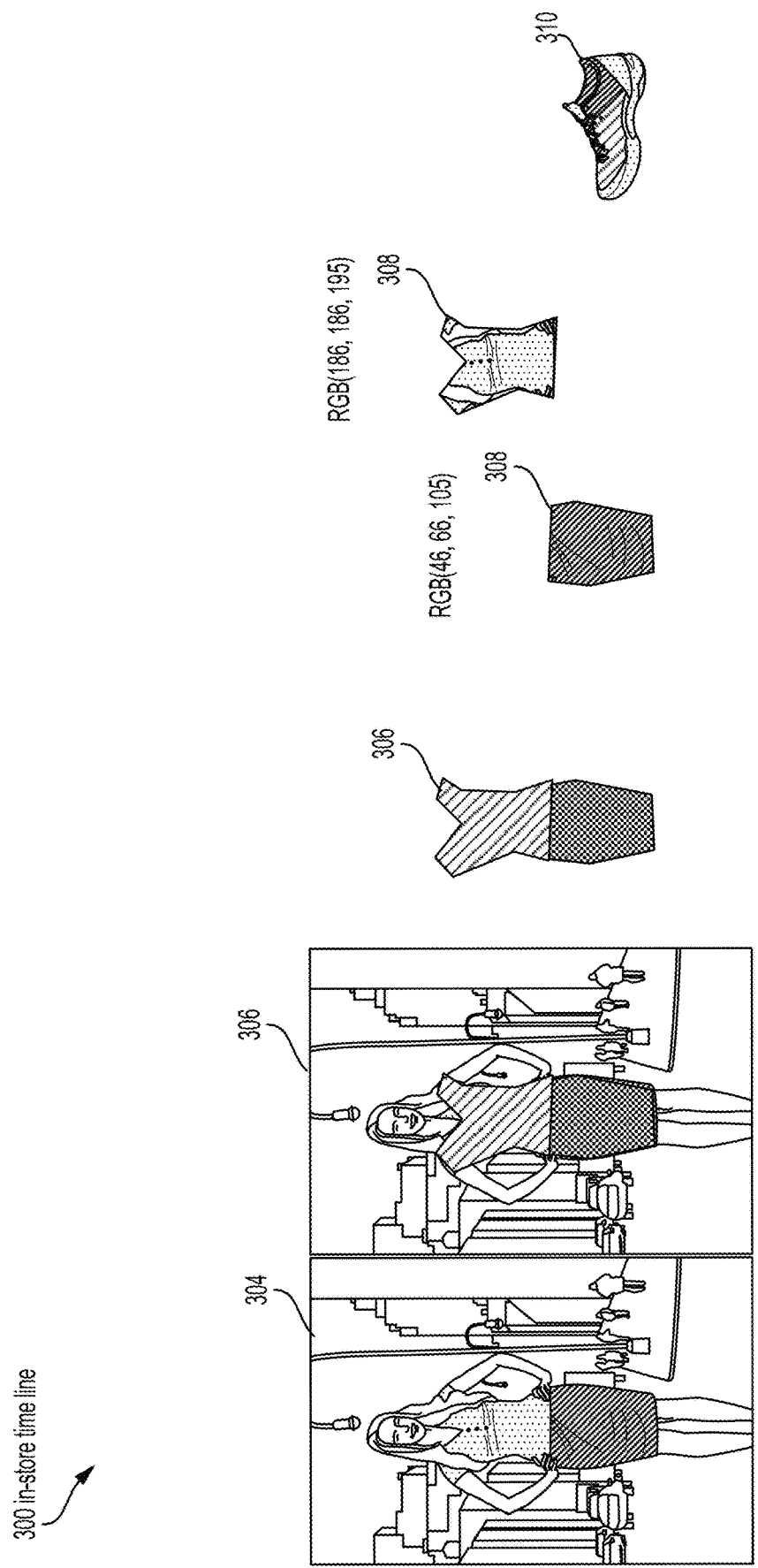
FIG. 3 depicts an example timeline of adapting content for presentation to a person in an environment, in accordance with an embodiment of the present invention.

FIG. 2 depicts a workflow for adaptive content targeting. In particular, FIG. 2 illustrates an example workflow 200 for adapting content to a targeted visitor to an environment. The workflow 200 begins at step 202 when a person 222 stops to look at screen 112. As shown, screen 112 can be an in-store display screen. In an example, screen 112 can be embodied as a touch sensitive display device which allows the person to enter data using an on-screen keyboard or other input device. At this point, in step 204, camera 114 will capture an image of person 222. This can be carried out using a webcam or other video camera. After the image is captured, step 206 is performed to detect the person's clothes shapes and to apply masks to those shapes.

Next, at step 208, each detected clothing item is analyzed. As shown, step 208 can include using a statistical median of colors in respective mask areas to determine RGB color values for those mask areas. In the example of FIG. 2, step 208 determines an RGB color value for a skirt worn by person 222 and another RGB value for a shirt worn by person 222.

Then, at step 210, results are presented to person 222. In the example of FIG. 2, the results are presented on screen 112 to person 222 while the person is in the store. As shown, the results include a campaign asset, displayed as a product image 224 (e.g., an image of shoes) on in-store screen 112. Step 210 presents the product image 224 with a color scheme that is compatible with the colors present in the clothes worn by person 222. In this way, workflow 200 promotes a product to person 222 by presenting an image of the product that has colors that compliment what person 222 is currently wearing. This may make person 222 more likely to purchase the presented product because person 222 can readily see, on screen 112, how the product would look if worn with the person's clothing items.

Workflow 200 can be performed using a digital signage device 115 with a screen 112 and camera 114 deployed in environments such as, for example, a store, a section of a store (e.g., an apparel or sportswear section), a show room, a museum, or other environments with fixed, mounted positions of screens and associated cameras. It is to be understood that in addition to mounted digital signage devices, embodiments can also display targeted content to mobile screens, such as for example, a tablet device associated with a section of a store (e.g., an apparel or sportswear section), a smartphone in use in the store section, and/or tethered devices such as tethered mobile devices in stores. Workflow 200 can be used to provide product information via embedded and tethered devices in environments such as car showrooms, and installations at venues for conferences and sporting events.

As seen in FIG. 2, workflow 200 can use a digital signage device that is communicatively connected to a camera via a local network (e.g., a local area network/LAN) and communicatively connected to an asset modeler via another suitable network (e.g., a wide area network/WAN, such as the Internet). Generally, the digital signage device can be any type of device, such as a personal computer (PC), tablet, or smart phone, configured to access and present content (e.g., a web page, images, a 3D product model, a word processing document, a fixed layout document, etc.) provided by a content-providing server of a content management tool. The digital signage device can include a screen for displaying, among other things, content rendered by a browser. The screen can also be used to display any other type of human-readable content. The screen can include any electronic visual display device (e.g., a conventional television or computer monitor, including a liquid crystal display (LCD) or a light emitting diode (LED) display). In some cases, the screen can be a large screen physically integrated into the digital signage device (e.g., such as found in an information kiosk or a wall-mounted device). In other cases, the digital signage device can be a mobile device having an integrated screen (e.g., such as a tethered mobile tablet device in a store). As would be readily apparent to one of ordinary skill in the art, such a mobile device can include input devices such as buttons and an integrated camera. The camera can be any device configured to detect light and form an image, such as a video camera or a webcam, for example. The screen can include any electronic visual display device (e.g., a conventional television or computer monitor, including a liquid crystal display (LCD) or a light emitting diode (LED) display).

By way of example, the digital signage device can be a tablet device (e.g., iPad® from Apple Inc., a device running an Android operating system, Microsoft Surface device, etc.), or other suitable mobile computing device. That is, the digital signage device can be a mobile computing device operating one of a variety of mobile operating systems and platforms, such as the iOS operating system (OS) developed by Apple Inc., the Android platform from Google Inc., a Microsoft Windows® OS, and similar operating systems providing wireless communications, content display, and image capture capabilities.

By way of further example, the digital signage device can include a personal computer or other suitable computing device, such as a desktop device. As will be appreciated in view of this disclosure, the digital signage device does not necessarily need to be mobile by design; however, if the digital signage device is mobile, the screen may be physically integrated into the digital signage device, instead of being a dedicated, separate display as shown in the non-limiting example of FIG. 2. Alternatively, as shown in the example of FIGS. 1 and 2, the digital signage device 115 can be a device where the screen 112 and camera 114 are physically integrated into the device. It will be understood that the functions of the computing devices variously described in this disclosure can be performed on and by any number of computing devices, depending on the particular application of the system. For instance, one or more digital signage devices can each include respective browsers, screens, and cameras. The digital signage devices can each include their own web browser or another application suitable for retrieving, processing, displaying and interacting with content provisioned by an asset modeler, a content management tool, a website server, or any combination of these or other servers. Data representing the content can be stored in a content repository accessible by the digital signage device. Such a content repository can be implemented using one or more databases or other storage devices accessible by the digital signage device.

Content stored in the content repository can be uniquely identified by an address, metadata, filename, version identifier, or other identifying information. Non-limiting examples of such identifying information include a version number, a serial number, a document file name/location (e.g., a URL), a numeric value, an access code, a text string, instructions that can be executed by a processor (e.g., 'retrieve content x from database y'), or any other data usable to identify and retrieve content such as campaign assets, product images, textual product information, color settings, and product models.

Example Timeline

FIG. 3 illustrates an example timeline 300 for presenting content that is adapted to a targeted person in an environment. The timeline 300 depicted in FIG. 3 is described with reference to the embodiments of FIGS. 1 and 2. However, timeline 300 is not limited to those example embodiments. At least a portion of the steps in timeline 300 can operate within a physical environment, such as a retail store, office, show room, lobby, transportation depot, library, restaurant, park, or any other space in which a person 222 (e.g., a visitor to the environment) is in proximity to screen 112, as will be described in further detail below.

The timeline 300 begins at time 304 when an image of a person is captured. As described above with reference to FIGS. 1 and 2, the image can be captured by a camera 114 of a digital signage device 115 at time 304 when the person stops or pauses near camera 114.

After the image of the person is captured, at time, 306 shapes of apparel or clothing items worn by the person are detected. As shown in FIG. 3, at time 306, masks can be created for areas of the captured image that correspond to two items of clothing worn by the person. Then, at time 308, colors present in the mask areas are analyzed. In the example of FIG. 3, RGB color values for the two items of clothing are calculated. In alternative or additional embodiments, at time 308, a median color value can be determined for each mask area by performing a pixel-by-pixel color analysis. This median color value can be a dominant color present in a clothing item. Next, at time 310, an asset is presented to the person. In the example of FIG. 3, the asset is an image of a shoe product whose color scheme has been selected based on the colors present in the person's clothing items. For instance, the asset displayed at time 310 has colors that are deemed compatible with the colors of the person's clothing. Decisions as to color compatibility between color schemes and clothing item colors can be made a priori by a marketer. Such decisions may be based in part on subjective criteria (e.g., avoiding color combinations that clash with each other and selecting colors that are available for the materials that a product is made from). For example, a color palette for a product may be limited based on what materials (e.g., fabrics, metals, plastics) the product being promoted is made out of.

In this way, timeline 300 represents a sequence for displaying an adapted asset that includes a clothing product image. In particular, timeline 300 culminates in presenting, at time 310, an asset that is an image of a shoe product that is shown to a given shopper whose image was captured at time 304. In use, the digital signage device used for timeline 300 can be any computing device configured to capture an image of a visitor, connect to a website, and receive a product image with a color scheme adapted to what the customer is wearing. The digital signage device can be configured to display the product image on its screen, such as screen 112 in FIGS. 1 and 2. In one non-limiting example, the digital signage device is an in-store computing device with a large, integrated screen sufficiently large to present a life-sized display of the visitor and/or a life-sized display of a product being promoted.

In timeline 300, an in-store digital signage device can be configured to present video content corresponding to a product image at a particular frame rate. Most standard display screens have a frame rate of 60 frames per second. However, an appropriate function, provided by the digital signage device and its operating environment can be used to manipulate the rendering in a single frame. For example, in a browser environment, this can usually be achieved by using the requestAnimationFrame method to tell the browser that a video player application wishes to perform an animation and request that the browser call a function to update the animation (e.g., a succession of frames). An example succession of frames can include the product image shown at time 310 in FIG. 3. Additionally, the digital signage device can be configured to receive the adapted video content at any point during the display of video frames. The adapted video content can be received from an asset modeler. In accordance with embodiments, the adapted video content shown at time 310 includes frames with product image where the product image has a color scheme determined to compliment colors of clothing items worn by the customer, where the clothing item colors were detected at time 308. In this way, the frames of video content with product image displayed on a digital signage device at time 310 will be color compatible with the clothing items worn by the visitor.

Example Methods

Figure 4:
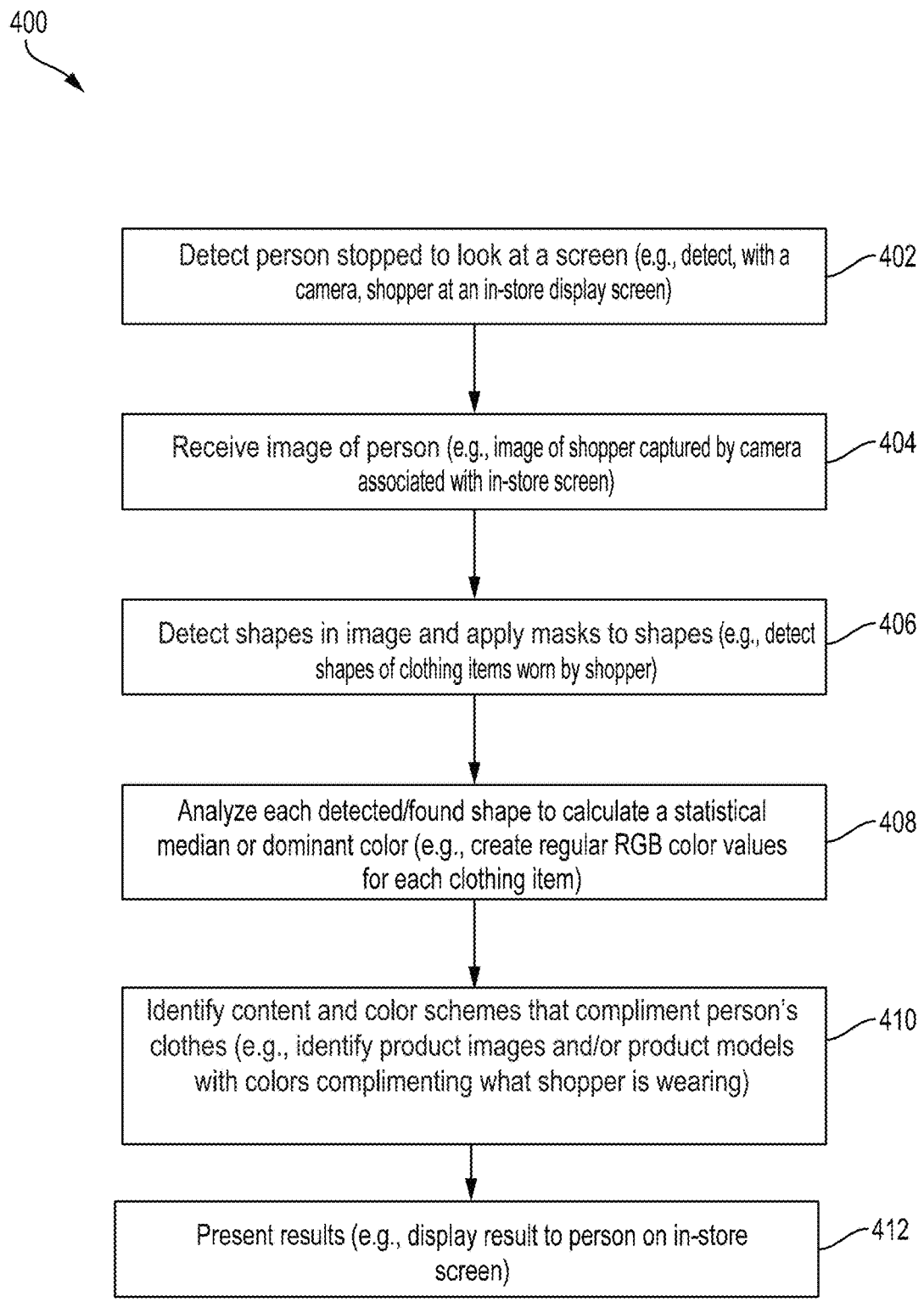
FIG. 4 is a flowchart illustrating an example method for adapting content for presentation to a targeted individual in an environment, in accordance with an embodiment of the present invention.

FIG. 4 is a flow diagram of an example method 400 for adapting content for presentation to a targeted visitor to an environment. Method 400 can be used to present adapted content on a device in an environment, such as a digital signage device in a store, in accordance with embodiments. The example method 400 may, for example, be implemented by components of system 100 of FIG. 1. In particular, the example method 400 may be implemented by the content management tool 102, asset modeler 104, and digital signage device 115 of FIG. 1.

The method 400 starts at 402 by detecting a person who has stopped to look at a screen. As shown in FIG. 4, block 402 can comprise detecting, with a camera, a shopper who is at an in-store display screen of a digital signage device. The digital signage device can be a specialized computing device configured to retrieve or receive adapted content from asset modeler 104 of FIG. 1. The person can be a shopper who pauses in front of camera 114 of the digital signage device 115 of FIG. 1.

Next, at 404, the method 400 further includes receiving an image of a person. This can be achieved, in some embodiments, by capturing an image of a shopper using a camera associated with a screen of a digital signage device, or other suitable techniques. The image can be a video frame of a store customer captured by a webcam or other suitable video camera.

The method 400 continues at 406 by detecting clothes shapes in the received image and applying a mask. This can include, in some embodiments, detecting shapes of apparel items worn by a shopper who is viewing the screen of an in-store digital signage device. For example, when the shopper pauses in front of a camera 114, and the camera captures an image of the shopper, block 406 can include analyzing the captured image to detect that the shopper is wearing a t-shirt and a skirt. In block 406, masking is done on the frame. At block 406, a mask can be created by using a cut of the frame where a clothing item (e.g., a t-shirt) is positioned in the frame. In one example, HTML5 camera technology can be used by the device to draw the image with the mask into the camera. This drawing is done in the background. That is, the masked image is not depicted on the screen for the shopper to view. In block 406, the masked image has the position of the clothing item cut out of the original video frame image of the shopper.

Then, at 408, each detected/found shape can be analyzed to create a simple statistical median of colors of the item. As shown in FIG. 4, block 408 can include producing regular red green blue (RGB) color values for each clothing item. When the shapes are detected from a video frame, block 408 can include using assistive clothing pattern recognition to find simple clothing patterns in the video frame. Examples of such clothing patterns include a t-shirt, pants, a blouse, shorts, and a skirt. The clothing pattern recognition detects shapes of clothing items worn by the shopper, and then compares those shapes to pre-defined shapes. For example, regardless of the shopper's gender or size, a t-shirt worn by the shopper will have a similar shape and can be identified as a t-shirt based on its shape. Block 408 can include determining average or dominant colors of the shopper's clothing items by going pixel by pixel through a masked area corresponding to each detected clothing item and calculating the average color or the statistical median of the pixels making up the clothing item. Alternatively, a median color or dominant can be determined instead of the average. This may be useful in cases where the shopper's clothing items are multicolored or patterned. The color analysis performed in block 408 can also determine an average color of a top (e.g., a shirt or blouse) worn by the shopper and an average color of a bottom (e.g., pants, shorts, or a skirt) worn by the shopper.

In block 408, the mask created at block 406 can be used to determine colors present within the mask area. For instance, in block 408, an average color can be determined that is an average or median color of the whole clothing item (e.g., the entire t-shirt). In an additional or alternative embodiments, block 408 can comprise determining a dominant color within the mask area, or determining if the top of the shopper's t-shirt area is different from the bottom color. At block 408, the mask can be used many different ways in order to determine colors present within the mask area (e.g., a dominant color, an average color, and statistical median colors of multiple clothing items).

After the detected clothing item shapes are analyzed and their colors are determined, control is passed to block 410 where content with color schemes that compliment what the shopper is wearing are determined. Based on the average or dominant colors determined in block 408, block 410 can identify a color-matched image of a complimentary product to be presented on the screen. Complimentary products and compatible color schemes can be selected by a marketer ahead of time. For instance, a marketer can use the marketer user interfaces shown in FIGS. 6-8 to define a campaign based on shoppers' clothes. As discussed below with reference to FIG. 6-8, the marketer interface enables the marketer to select products with certain color schemes that are to be presented to a shopper wearing clothes having identified colors. With the example of a shoe product, a default color of red can be selected, and when a shopper stops in front of the screen and the device determines that the person is wearing a blue t-shirt and white pants, then the device can decide, based upon determining that the t-shirt is blue, to try to find a matching or complimentary blue color for the shoe. In addition to the t-shirt, the color matching decision in block 410 for a shoe product (e.g., a shoe) can be further based on a calculated average color of pants or a skirt the shopper is wearing.

Next, at 412, results are presented. As shown, block 412 can include displaying results to a person on an in-store screen. At block 412, the adapted content can be displayed on a digital signage device's screen, such as screen 112 of FIG. 1. In this way, the shopper can be presented with an image of a product that is color-matched to be coordinated with what the shopper is currently wearing. For example, an image of a shoe having a color scheme that compliments the customer's t-shirt can be presented on the screen in block 412. At block 412, a digital signage device may present a 3D model of a product such as a shoe, where the product has its color adapted or changed color (e.g., from a default color of red to an adapted color of blue) based on what colors the customer is wearing. The shopper can then interact with the screen to manipulate the image (e.g., rotate and/or zoom the image, change the product color(s), and simulate selection of product accessories). The shopper can also use the device to determine in-store availability of the product having the selected color scheme.

The method 400 can repeat one or more of blocks 402-412 to continue to detect additional shoppers and/or receive additional shopper images (e.g., after the shopper tries on different clothing items in the store), which in turn cause different product images having different color schemes to be presented. For example, the method 400 may be used to present 3D product models and product images as web content in response to the shopper trying on or holding up different clothing items that are captured by the camera. That is, method 400 can be used to adapt content to a targeted shopper as the shopper uses the digital signage device to display various clothing items having different color schemes.

Figure 5:
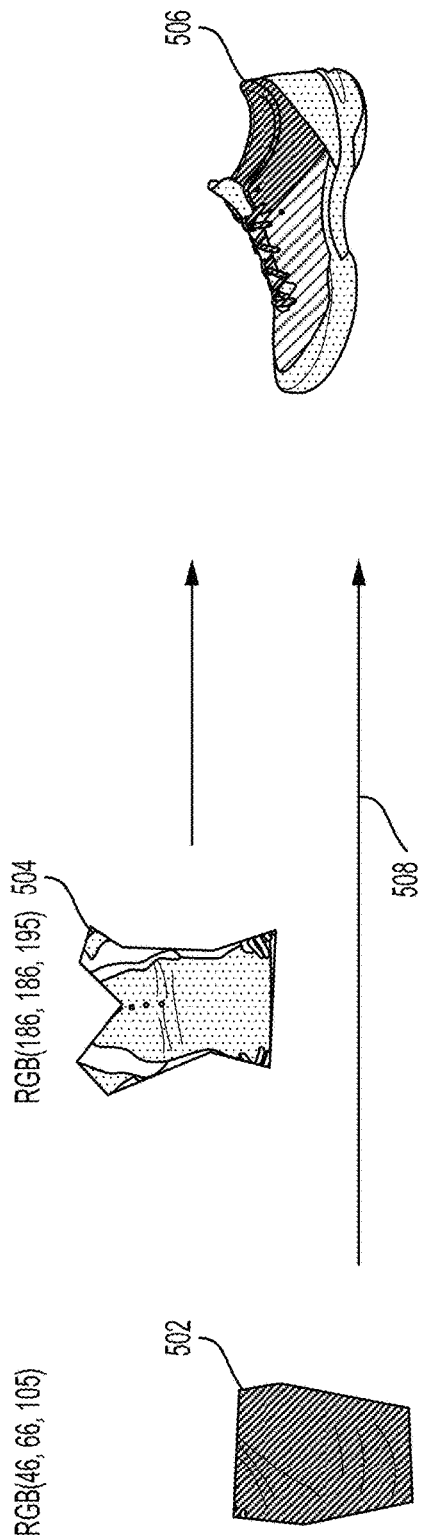
FIG. 5 is an example process for adapting campaign content to be presented to a visitor to an environment, in accordance with an embodiment of the present invention.
Figure 6:
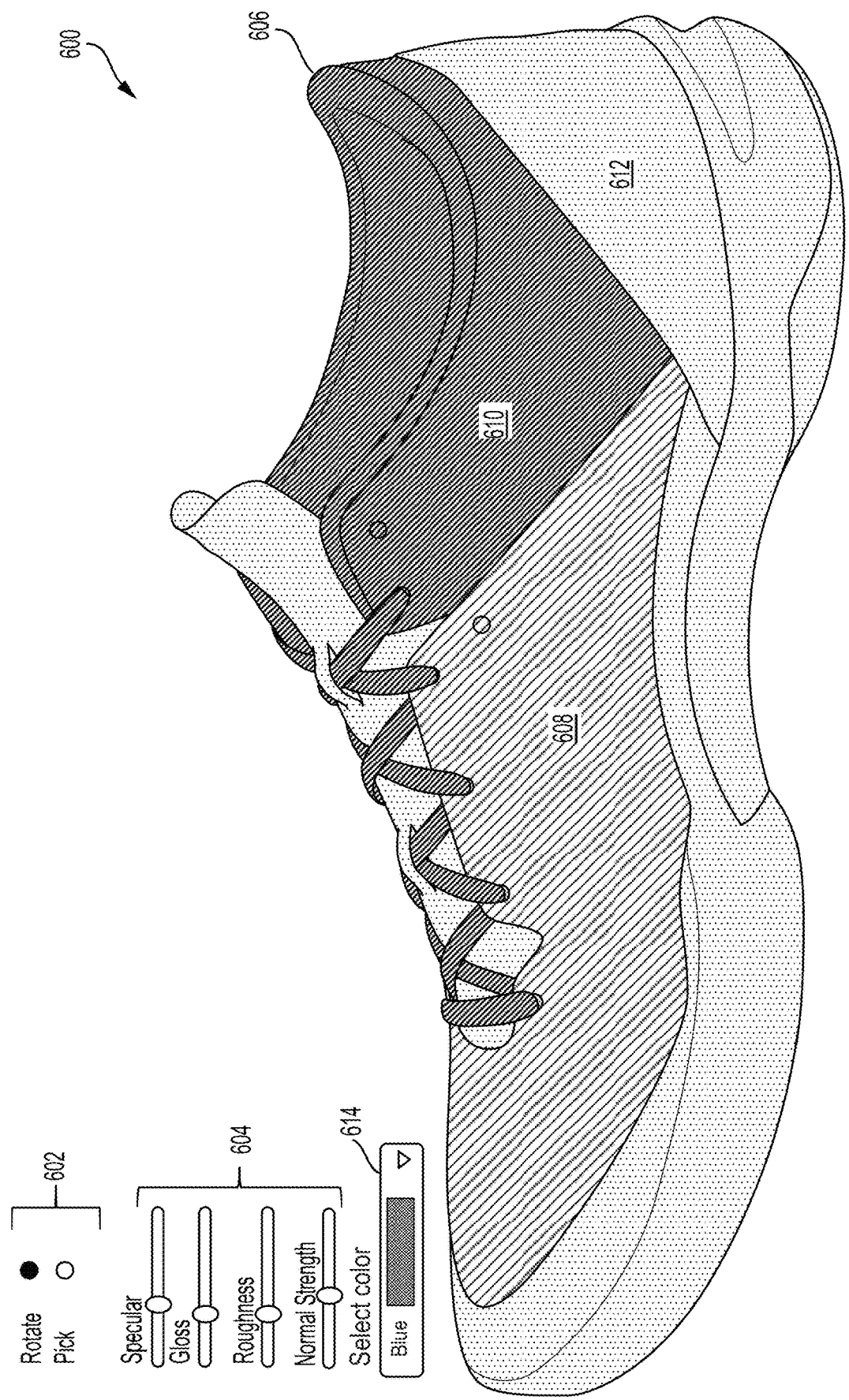
FIGS. 6-8 illustrate an interactive marketer interface for selecting adaptable content to be displayed on screens in an environment, in accordance with various embodiments.
Figure 7:
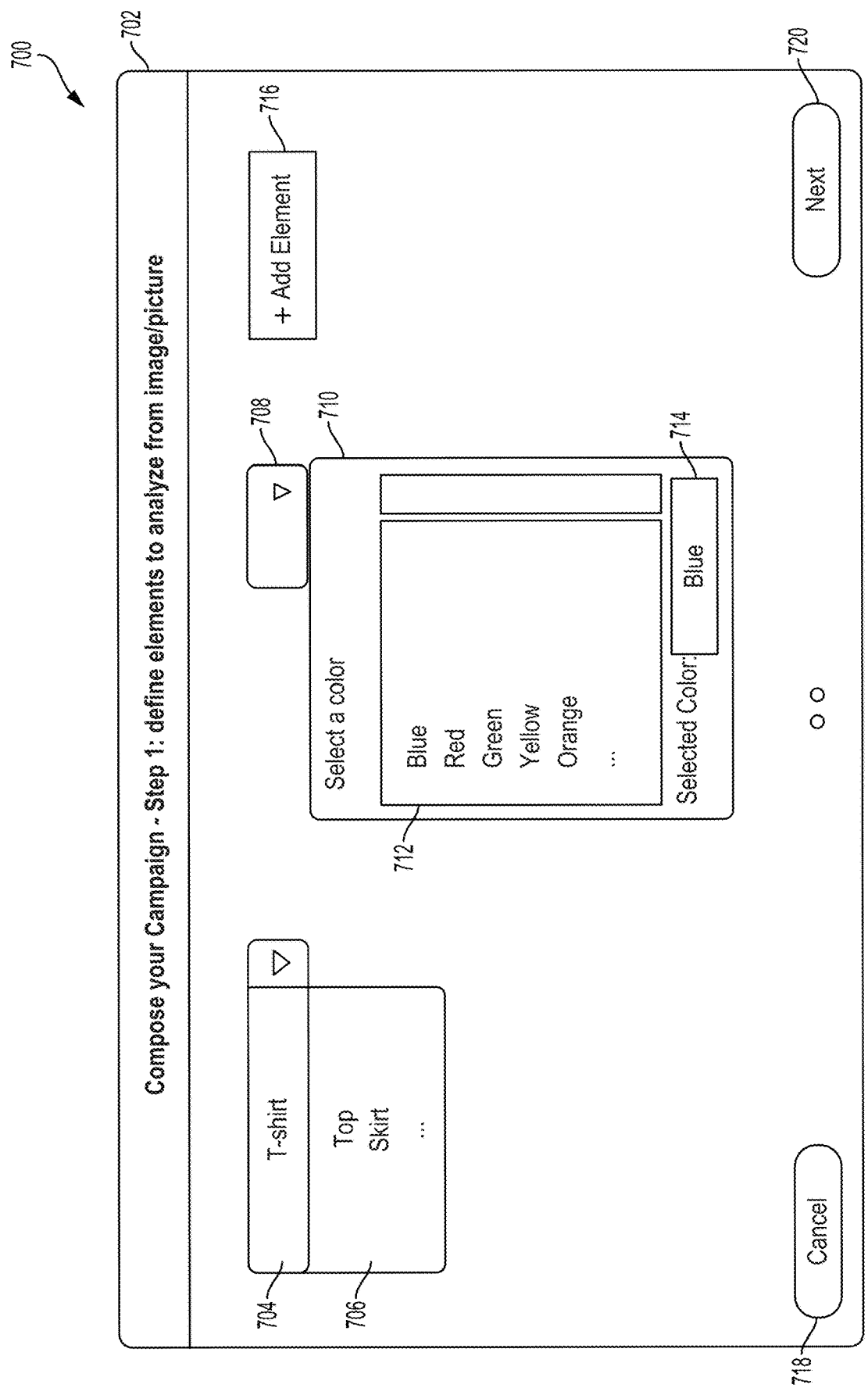
Figure 8:
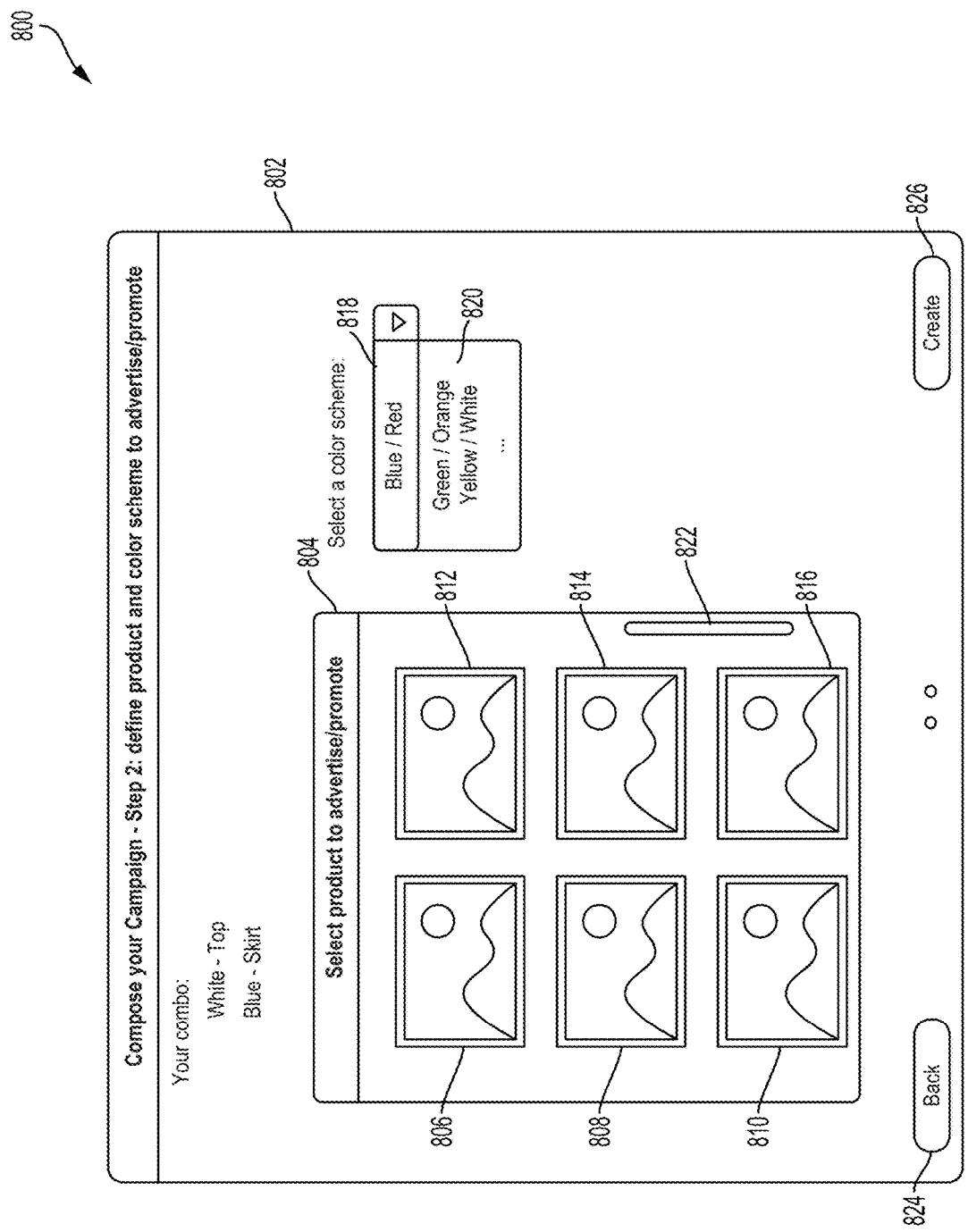

FIG. 5 is an example process 500 for adapting campaign content to be presented to a visitor to an environment. As shown, process 500 can be used by a marketer to define a campaign based on a person's clothes colors. For instance, process 500 can be performed after the marketer uses a user interface to define a campaign. Such an interface is depicted in FIGS. 6-8, which are described below. Process 500 includes step 502 where an RGB value for a first clothing item worn by a shopper is calculated. In the example of FIG. 5, this first clothing item is a bottom (e.g., a blue skirt) worn by a customer whose image has been captured at a store.

Then, at step 504, an RGB value for a second clothing item worn by the shopper is calculated. As shown, the second clothing item is a top (e.g., a white shirt or blouse) worn by the customer. As there are multiple colors present in the top, the RGB value for the second clothing item represents a median or dominant color of the top.

Next, at step 506, the RGB color values of the white top and the blue skirt are used to decide to select a product to promote to the customer. In the non-limiting example of FIG. 5, process 500 uses the defined campaign to determine that shoes with a blue and red color scheme or pattern should be presented to the customer. The determination is made based at least in part on the knowledge that the customer is wearing a white top and a blue bottom.

Example Marketer User Interfaces

FIGS. 6, 7, and 8 depict user interfaces. The interfaces can be used by a marketer to select products such as apparel items (e.g., shoes, purse, clothing items) for a promotional or marketing campaign. In some embodiments, the UIs shown in FIGS. 6-8 are marketer interfaces of a campaign tool for planning, managing and executing campaigns, such as for example, Adobe® Campaign. The user interfaces (UIs) 600, 700, and 800 depicted in FIGS. 6, 7, and 8 are described with reference to the embodiments of FIGS. 1-5. However, the UIs are not limited to those example embodiments. In one embodiment, the UI is displayed on a display associated with content management tool 102. In additional or alternative embodiments, the UIs can be displayed on display devices of other computing devices, such as computing devices connected to the content management tool 102 via a WAN network or the Internet. However, the content targeting and authoring operations are not intended to be limited to the example devices and platforms shown in FIG. 1. For ease of explanation, the campaign composition operations discussed in FIGS. 6-8 are in the context of a client application executing on a computing device with a display device. It is to be understood that the user interfaces illustrated in the example embodiments of FIGS. 6-8 can be readily adapted to execute on displays of a variety of computing device platforms running a variety of operating systems that support an interactive user interface.

Throughout FIGS. 6-8, displays are shown with various icons, buttons, links, command regions, windows, toolbars, menus, and drop down lists that are used to initiate action, invoke routines, define clothing items to analyze, select complimentary color schemes for the clothing items, search for assets, select assets, simulate display of selected assets, or invoke other functionality. The initiated actions include, but are not limited to, selecting an asset to be displayed, selecting compatible colors, and other campaign administrative actions. For brevity, only the differences occurring within the figures, as compared to previous or subsequent ones of the figures, are described below.

The interfaces depicted in FIGS. 6-8 can be used by a marketer to select content, such as, but not limited to product images or advertising content and adapt the images and content to targeted visitors to an environment. The example marketer UIs 600, 700, and 800 can be launched in response to determining that an asset is be selected and adapted for display to a visitor to an environment.

As shown in FIG. 6, a UI 600 can be used to select a color scheme for a shoe product 606. The UI 600 includes a menu 602 with radio buttons to select/pick an image of the product and to rotate the image of the product. UI 600 also includes a set 604 of slider controls that can be used to simulate different textures of the product. Example set 604 includes sliders to simulate changes to the product's glossiness and roughness. UI 600 also includes a color selector drop down menu 614 that can be used to select colors for different portions of the product. In the example of FIG. 6, the color selector drop down menu 614 of UI 600 has been used to select different colors for regions 608, 610, and 612 of the shoe product 606. Different instances or versions of the product can be selected and targeted for display at a selected location within an environment. In the examples of FIG. 6, the location can be an area (e.g., a sporting goods section) of a store. UI 600 can be used to preview how a selected product image or model can be displayed on various digital signage devices that are associated with a location (e.g., a department or show room of a store). As shown in FIG. 6, UI 600 can be used to preview and manipulate a 3D product model (e.g., a 3D model of shoe product 606) produced by asset modeler 104.

The example UI 700 of FIG. 7 includes drop down menus 704, 708, 716 and buttons 718 and 720 that a marketer can use to select items for a campaign when composing the campaign. The UI 700 can be used to define elements to analyze from a captured image of a shopper. As shown in FIG. 7 the marketer can use menu 704 to select a t-shirt element from list 706 that includes clothing items that can be analyzed. In the example of FIG. 7, color adaption settings for campaign content can be selected via menu 708, where colors for a clothing item are selected from list 712. As shown in FIG. 7, the marketer has used menu 708 to indicate a selected color 714 of blue. The marketer UI 700 enables a marketer user to add other elements to be analyzed by selecting add element menu 716 to present other elements (e.g., other clothing or apparel items). If the marketer wishes to cancel settings or selections, the cancel button 718 can be selected. After the marketer defines elements to analyze, next button 720 can be selected to proceed to UI 800 shown in FIG. 8.

UI 800 can be used to compose a campaign by defining a product and color scheme to advertise or promote. As shown in FIG. 8, menu 804 of UI 800 can be used to select one or more of products 806, 808, 810, 812, 814, and 816 based on a given color combination (e.g., white top and blue bottom/skirt). Slider 822 can be used to navigate between images of products 806, 808, 810, 812, 814, and 816. Menu 818 can be used to select a color scheme for a selected product image. As shown, a list 820 of available color schemes is presented in UI 800. The back button 824 can be used to return to UI 700, and the create button 826 can be used to create a campaign based on selections made in UIs 600, 700, and 800.

By using UIs 600, 700, and 800, adaption settings can be selected for content to be presented at a digital signage device along with data indicating how the content should be adapted for a target visitor (e.g., based on the colors of clothes a shopper at a digital signage device is wearing). Within UI 600, an administrator can find content 420 using asset search menu 418, select image 422, and drag and drop the selected image 422 to target devices 402A, 402B, 404, and/or 406 at location 410.

By using UIs 600, 700, and 800 in conjunction with content management tool 102 and asset modeler 104, embodiments enable a marketer to define a product to be included in a campaign, select color schemes complimenting clothing items having certain colors, and simulate display of the product. These embodiments improve efficiency of system 100 by not requiring use of a dedicated server or other dedicated hardware to compose a campaign. For instance, by using interfaces 700 and 800 to pre-define pairings of compatible colors between clothing items and products, the digital signage device 115 does not have to determine compatible or complimentary color schemes.

Example Computer System Implementation

Figure 9:
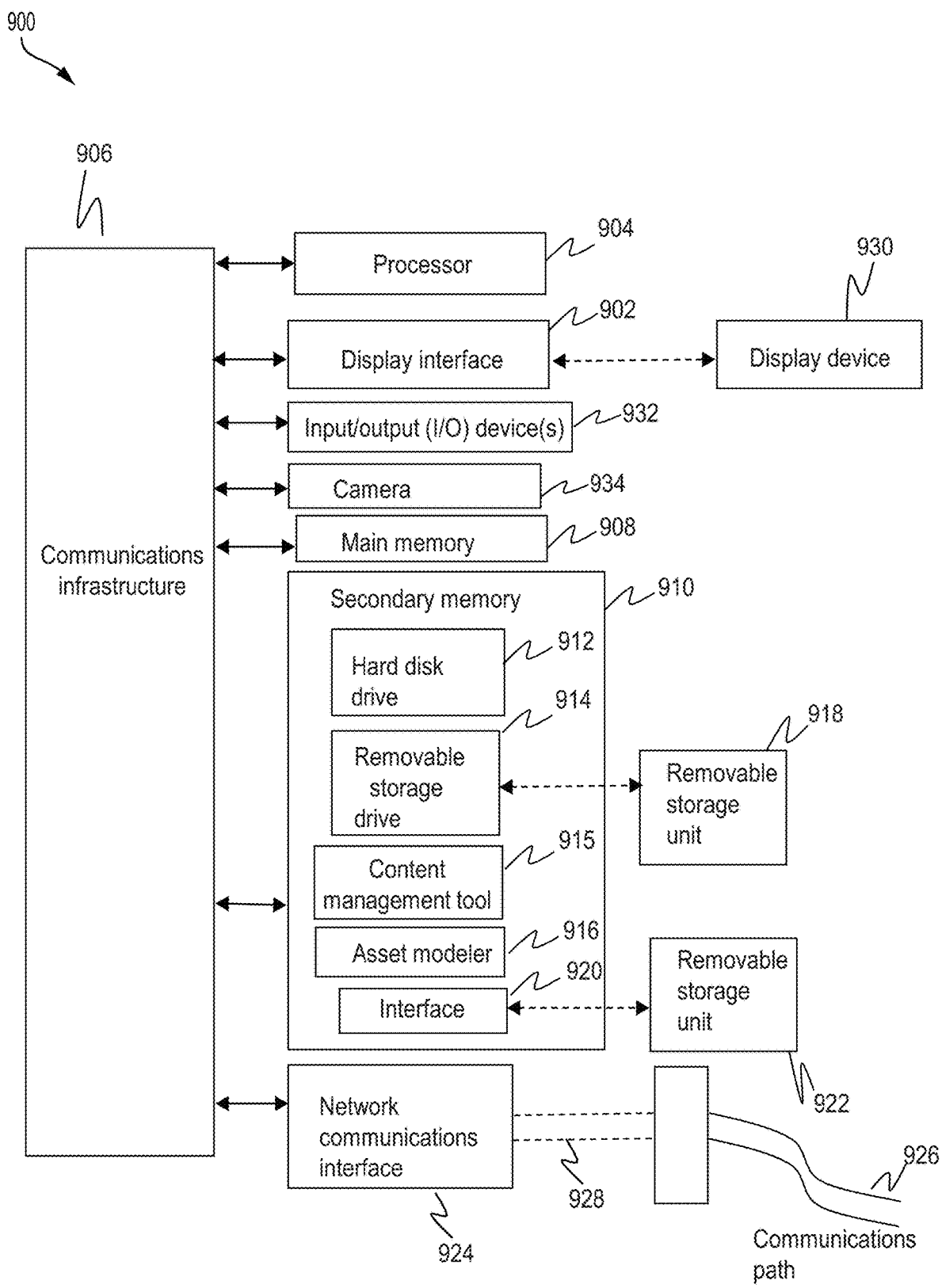
FIG. 9 is a diagram of an example computer system in which embodiments of the present disclosure can be implemented.

Although example embodiments have been described in terms of apparatuses, systems, services, and methods, it is contemplated that certain functionality described herein may be implemented in software on microprocessors, such as a microprocessor chip included in computing devices such as the computer system 900 illustrated in FIG. 9. In various embodiments, one or more of the functions of the various components may be implemented in software that controls a computing device, such as computer system 900, which is described below with reference to FIG. 9.

To implement the various features and functions described above, some or all elements of the devices (e.g., digital signage device 115) and servers (e.g., a server used to implement content management tool 102 and asset modeler 104) may be implemented using elements of the computer system of FIG. 9. More particularly, FIG. 9 illustrates an example computer system 900 for implementing the techniques in accordance with the present disclosure.

Aspects of the present invention shown in FIGS. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example computer system 900 in which embodiments of the present invention, or portions thereof, may be implemented as computer-readable instructions or code. For example, some functionality performed by system 100 shown in FIG. 1 can be implemented in the computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement the workflow 200 illustrated by FIG. 2 discussed above. Similarly, hardware, software, or any combination of such may embody certain modules and components used to implement steps in the flowchart illustrated by FIG. 4 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 904 may be a special purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme. In certain embodiments, a processor of one or more of the computing devices and servers described above with reference to FIG. 1 can be embodied as the processor device 904 shown in FIG. 9.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. In non-limiting embodiments, one or more of the memories of digital signage devices and servers discussed above with reference to FIG. 1 can be embodied as the main memory 908 shown in FIG. 9.

The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a non-transitory computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or EEPROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 908 and secondary memory 910, which can be memory semiconductors (e.g., DRAMs, etc.). Computer readable medium and non-transitory computer readable medium can also refer to removable storage unit 918, removable storage unit 922, and a hard disk installed in hard disk drive 912. Signals carried over communications path 926 can also embody the logic described herein. These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the steps in the methods illustrated by the flowchart of FIG. 4, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

In an embodiment, display screens 112 of FIGS. 1 and 2 used to display adapted content and the marketer user interfaces shown in FIGS. 6-8 may be a computer display 930 shown in FIG. 9. The computer display 930 of computer system 900 can be implemented as a touch sensitive display (i.e., a touch screen). The computer display 930 can connect to communications infrastructure via display interface 902 to display electronic content such as the results of method 300. For example, the computer display 930 can be an in-store display (e.g., a large in-store screen) used to display targeted content such as a tailored image of a product to be promoted or advertised. Also, for example, computer display 930 can be used to display the marketer UIs 600, 700, and 800 shown in FIGS. 6, 7, and 8, respectively. As shown in FIG. 9, computer system 900 can also include an input device 932 and a camera 934. In an embodiment, camera 934 can be a camera associated with display 930. For instance, camera 934 can be a camera integrated with display 930 or mounted on top of display 930. Camera 934 can be a webcam or any other suitable video camera capable of capturing video frames of people viewing display 930.

In the non-limiting example shown in FIG. 9, secondary memory 910 includes a content management tool 915 and an asset modeler 916. Content management tool 915 and asset modeler 916 can be implemented as computer programs stored in secondary memory 910.

According to one example, content management tool 915 can be a tool included in a content management system, such as, for example, Adobe® Experience Manager. By using content management tool 915, a marketer can manage an advertising campaign. Content management tool 915 can be used to select and modify campaign content, and can include a marketer interface, such as the example interfaces shown in FIGS. 6-8, discussed above.

Asset modeler 916 can be a tool that creates a 3D model of a product of interest (e.g., a shoe). Asset modeler 916 can create a model that depicts the product's textures and colors that have been assigned to different parts of the product. Asset modeler 916 can be implemented using the Adobe® Scene7 dynamic media platform. Asset modeler 916 can use information obtained from camera 934 and content management tool 915 to change the color or the texture of the model. Asset modeler 916 can produce a 3D product model as shown in the example of FIG. 6, discussed above.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
    receiving, at a computing device, an image of a user and a mask that corresponds to a clothing shape depicted in the image of the user;
    calculating, by the computing device, one or more color attributes for an area of the image within the mask, wherein each of the one or more calculated color attributes indicates a color of clothing worn by the user and is based on a color analysis of pixels in the image that correspond to the clothing shape indicated by the mask;
    determining, based on the one or more calculated color attributes, a complimentary color scheme including multiple colors;
    determining a compatible color attribute that is based on the one or more calculated color attributes for the area of the image and the complimentary color scheme;
    identifying, by the computing device, electronic content comprising a three-dimensional (3D) model, the identifying based on the one or more calculated color attributes for the area of the image;
    adapting, based on the compatible color attribute, the 3D model, wherein the adapted 3D model has a color scheme that is based on the compatible color attribute;
    generating modified electronic content based on the adapted 3D model, wherein the modified electronic content includes the color scheme that is based on the compatible color attribute; and
    providing the modified electronic content for display.

2. The method of claim 1, wherein the mask corresponds to multiple clothing shapes depicted in the image, the method further comprising:
    determining, for each of the multiple clothing shapes, a respective subset of the pixels in the image, wherein the respective pixel subset corresponds to a respective one of the multiple clothing shapes and each pixel in the respective pixel subset is classified as belonging to the respective one of the multiple clothing shapes; and
    determining, based on an additional color analysis of the respective pixel subset, an additional color attribute for an additional area of the image, the additional color attribute indicating an additional color of the respective one of the multiple clothing shapes,
    wherein determining the complimentary color scheme is further based on the additional color attribute of each of the multiple clothing shapes.

3. The method of claim 1, wherein calculating the one or more calculated color attributes for the area of the image comprises one or more of:
    defining, by the computing device, the mask corresponding to the clothing shape in the image, wherein the area of the image is within the mask;
    analyzing pixels of the area of the image within the mask to calculate a statistical median color for the area of the image within the mask;
    analyzing pixels of the area of the image within the mask to determine a dominant color of the area of the image within the mask;
    determining a shape of the clothing shape in the area of the image within the mask to determine a type of the clothing worn by the user; or
    calculating dimensions of an item in the area of the image within the mask to determine a size of the clothing worn by the user.

4. The method of claim 3, wherein detecting the clothing shape comprises using an automatic shape detection technique to detect the clothing shape in the image of the user.

5. The method of claim 3, wherein determining the shape in the image comprises performing assistive clothing pattern recognition to detect the clothing shape in the image.

6. The method of claim 1, wherein the identified electronic content further comprises a plurality of images of a product.

7. The method of claim 6, wherein the 3D model is a product model depicting the product.

8. The method of claim 1, wherein the identified electronic content further includes:
    web content from a content management tool; and
    an asset from an asset modeler, the method further comprising:
    displaying the web content and the asset on a display of the computing device.

9. A system comprising:
    a processing device;
    a display device;
    an input device;
    at least one camera; and
    a content management tool implemented on the processing device and configured to perform operations for adapting electronic content for presentation to a user, the operations comprising:
        capturing, by the at least one camera, an image of the user;
        presenting, on the display device, electronic content items retrieved from a content repository;
        receiving, via the input device, a selection of one or more of the presented electronic content items;
        calculating one or more color attributes for an area of the image within a mask, the mask corresponding to a clothing shape depicted in the image of the user, wherein each of the one or more calculated color attribute indicates a color of clothing worn by the user and is based on a color analysis of pixels in the image that correspond to the clothing shape indicated by the mask;
        determining, based on the one or more calculated color attributes, a complimentary color scheme including multiple colors;
        determining a compatible color attribute that is based on the one or more calculated color attributes for the area of the image and the complimentary color scheme;
        identifying a three-dimensional (3D) model associated with the selected electronic content item, the identifying based at least in part on the selection and the one or more calculated color attributes for the area of the image;
        adapting the 3D model, wherein the adapted 3D model has a color scheme that is based on the compatible color attribute; and
        updating the display device to present additional electronic content items each having a respective color scheme similar to the compatible color attribute.

10. The system of claim 9, wherein presenting the electronic content items comprises displaying life-sized representations of one or more products on the display device.

11. The system of claim 9, wherein the content repository comprises additional 3D models depicting products.

12. The system of claim 9, wherein updating the display device comprises presenting the additional electronic content items from a remote server, the remote server containing electronic content for products offered by a store.

13. The system of claim 9, wherein calculating the one or more calculated color attributes for the area of the image comprises:
    detecting, by a shape detection module of the content management tool, the clothing shape depicted in the image of the user;
    defining the mask such that boundaries of the mask correspond to boundaries of the clothing shape;
    analyzing pixels of the area of the image within the mask to calculate respective statistical median colors for the area of the image within the mask; and
    analyzing pixels of the area of the image within the mask to determine a respective dominant color of the area of the image within the mask.

14. The system of claim 9, the operations further comprising:
    calculating an item type attribute for the area of the image within the mask, the item type attribute indicating a type of the clothing worn by the user,
    wherein the selected electronic content item has a product type that is different from the calculated item type attribute.

15. The system of claim 14, wherein the mask corresponds to multiple clothing shapes depicted in the image, the operations further comprising:
    determining, for each of the multiple clothing shapes, a respective subset of the pixels in the image, wherein the respective pixel subset corresponds to a respective one of the multiple clothing shapes; and
    calculating, for each of the multiple clothing shapes, an additional item type attribute,
    wherein determining the complimentary color scheme is further based on the additional item type attribute of each of the multiple clothing shapes.

16. A non-transitory computer readable storage medium having executable instructions stored thereon, that, if executed by a computing device, cause the computing device to perform operations, the instructions comprising:
    instructions for receiving an image of a user;
    instructions for calculating one or more color attributes for an area of the image within a mask, the mask corresponding to a clothing shape depicted in the image of the user, wherein each of the one or more calculated color attribute indicates a color of clothing worn by the user and is based on a color analysis of pixels in the image that correspond to the clothing shape indicated by the mask;
    instructions for determining, based on the one or more calculated color attributes, a complimentary color scheme including multiple colors;
    instructions for determining a compatible color attribute that is based on the one or more calculated color attributes for the area of the image and the complimentary color scheme;
    instructions for identifying electronic content comprising a three-dimensional (3D) model, the identifying based on the one or more calculated color attributes for the area of the image;
    instructions for adapting, based on the compatible color attribute, the 3D model, wherein the adapted 3D model has a color scheme that is based on the compatible color attribute;
    instructions for generating modified electronic content based on the adapted 3D model, wherein the modified electronic content includes the color scheme that is based on the compatible color attribute; and
    instructions for providing the modified electronic content for display.

17. The non-transitory computer readable storage medium of claim 16, the instructions further comprising:
    instructions for displaying the adapted 3D model; and
    instructions for receiving input for manipulating a spatial orientation of the displayed adapted 3D model.

18. The non-transitory computer readable storage medium of claim 17, the instructions further comprising:
    instructions for receiving user input for manipulating additional attributes of the displayed adapted 3D model, the additional attributes including one or more colors of the displayed adapted 3D model.

19. The non-transitory computer readable storage medium of claim 16, wherein the instructions further comprise:

detecting the clothing shape in the image using an automatic shape detection technique to detect the clothing shape in the image of the user.

20. The non-transitory computer readable storage medium of claim 19, the instructions further comprising:
instructions for comparing the clothing shape in the image of the user to pre-defined shapes of clothing items.

* * * * *